United States Patent
Chi et al.

(10) Patent No.: US 9,618,685 B2
(45) Date of Patent: Apr. 11, 2017

(54) LIGHT GUIDE PLATE AND METHOD FOR FABRICATING THE SAME

(71) Applicant: Samsung SDI Co., Ltd., Yongin-si (KR)

(72) Inventors: Jun Ho Chi, Uiwang-si (KR); Woo Suk Chei, Uiwang-si (KR); Jong Chan Hur, Uiwang-si (KR); Eun Byul Lee, Uiwang-si (KR); Kyu Buem Choi, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 162 days.

(21) Appl. No.: 14/580,490

(22) Filed: Dec. 23, 2014

(65) Prior Publication Data

US 2015/0185404 A1   Jul. 2, 2015

(30) Foreign Application Priority Data

Dec. 26, 2013   (KR) .......................... 10-2013-0164309

(51) Int. Cl.

| | |
|---|---|
| *C08G 64/02* | (2006.01) |
| *F21V 8/00* | (2006.01) |
| *B29D 11/00* | (2006.01) |
| *C08G 64/06* | (2006.01) |
| *C08G 64/30* | (2006.01) |
| *C08G 64/04* | (2006.01) |
| *B29K 69/00* | (2006.01) |

(52) U.S. Cl.
CPC ...... *G02B 6/0065* (2013.01); *B29D 11/00663* (2013.01); *C08G 64/06* (2013.01); *C08G 64/307* (2013.01); *B29K 2069/00* (2013.01); *G02B 6/0035* (2013.01); *G02B 6/0046* (2013.01)

(58) Field of Classification Search
CPC .............................. C08G 64/307; C08G 64/06
USPC .................................................. 528/196, 198
See application file for complete search history.

(56) References Cited

U.S. PATENT DOCUMENTS

| | | |
|---|---|---|
| 2009/0162628 A1 | 6/2009 | Kurokawa et al. |
| 2010/0210811 A1 | 8/2010 | Kato et al. |
| 2011/0112240 A1 | 5/2011 | Krauter et al. |
| 2012/0217439 A1 | 8/2012 | Higaki et al. |
| 2014/0042646 A1 | 2/2014 | Kurokawa et al. |
| 2016/0122533 A1* | 5/2016 | Tomita .................... C08L 69/00 428/220 |
| 2016/0187565 A1* | 6/2016 | Chei .................... G02B 6/0065 362/611 |

FOREIGN PATENT DOCUMENTS

| | | |
|---|---|---|
| CN | 101356233 A | 1/2009 |
| CN | 101541856 A | 9/2009 |
| CN | 101805501 A | 8/2010 |
| CN | 102597111 A | 7/2012 |
| KR | 10-2011-0050381 A | 5/2011 |
| KR | 10-2011-0078214 | 7/2011 |
| KR | 10-2013-0018988 | 2/2013 |
| KR | 10-1267273 B1 | 5/2013 |

OTHER PUBLICATIONS

Office Action in counterpart Chinese Application No. 2014108206619 dated Mar. 31, 2016, pp. 1-7.
Office Action in counterpart Korean Application No. 10-2013-0164309 dated Mar. 10, 2016, pp. 1-6.

\* cited by examiner

*Primary Examiner* — Terressa Boykin
(74) *Attorney, Agent, or Firm* — Additon, Higgins & Pendleton, P.A.

(57) ABSTRACT

Disclosed herein is a light guide plate formed by injection molding of an aromatic polycarbonate resin that is a polymer of an aromatic dihydroxy compound and a diaryl carbonate. The aromatic dihydroxy compound and the diaryl carbonate are present in a mole ratio of about 1:1.02 to about 1:1.35, and the aromatic polycarbonate resin has a weight average molecular weight from about 10,000 g/mol to about 18,000 g/mol and includes about 5 mol % to about 30 mol % of terminal hydroxyl groups relative to total moles of terminal groups. The light guide plate formed of the aromatic polycarbonate resin can reduce a yellowing phenomenon upon injection molding, can exhibit low color deviation under high temperature and high humidity conditions, and can secure excellent properties in terms of discoloration resistance, and brightness quality (brightness uniformity), and the like.

8 Claims, 1 Drawing Sheet

LIGHT GUIDE PLATE AND METHOD FOR FABRICATING THE SAME

CROSS-REFERENCE TO RELATED APPLICATION

This application claims priority under 35 USC Section 119 to and the benefit of Korean Patent Application No. 10-2013-0164309, filed Dec. 26, 2013, the entire disclosure of which is incorporated herein by reference.

FIELD OF THE INVENTION

The present invention relates to a light guide plate and a method for fabricating the same.

BACKGROUND

Since a liquid crystal screen of a liquid crystal display (LCD) is not self-emissive, a mirror is placed behind liquid crystals to reflect light which enters the screen through a front side of the liquid crystal display, or a backlight unit (BLU) is placed at a rear side of the liquid crystal display to emit light such that transmittance and colors of the light are adjusted to allow the screen to be viewed.

FIG. 1 is a sectional view of a typical backlight unit. Referring to FIG. 1, the backlight unit may include a light source 10, a light guide plate 20, a reflective sheet 30, and optical sheets 40, which include a diffusive sheet 42, a prism sheet 44, a protective sheet 46, and the like. As for the light source 10, a self-emissive device such as a light emitting diode (LED), fluorescent lamp, cold cathode tube, laser diode, organic EL, and the like is used.

Light emitted from the light source 10 is incident upon an incident face of the light guide plate 20. The light guide plate 20 serves to convert spot light into surface light, and may include a wedge-shaped light guide plate, one surface of which has an oblique plane, a planar light guide plate, and the like. Light emitted from the light source 10 is converted into face light having uniform brightness through total reflection, diffusive reflection, refraction and diffraction inside the light guide plate 20, and exits the light guide plate through an upper surface (front surface) and a lower surface (rear surface) thereof.

Here, the light that exits the light guide plate 20 through the lower surface thereof is incident upon the reflective sheet 30. The reflective sheet 30 reflects the light towards the upper surface of the light guide plate 20. Then, the light reflected towards the upper surface of the light guide plate 20 enters the optical sheets 40. The optical sheets 40 are generally composed of the diffusive sheet 42, the prism sheet 44, the protective sheet 46, and the like. The diffusive sheet 42 serves to spread the incident light, the prism sheet 44 serves to partially collect the light, and the protective sheet 46 serves to protect the diffusive sheet 42 and the prism sheet 44 from being damaged due to foreign matter, scratches, and the like. Typically, light emitted from the light source increases viewing angle and reduces brightness while passing through the light guide plate 20 and the optical sheets 40.

Conventionally, the light guide plate is generally formed of resins such as polymethyl methacrylate (PMMA) and the like. However, in order to provide displays capable of projecting clearer images and to prevent deformation of the light guide plate due to heat generated from the light source, such resins are being replaced by an aromatic polycarbonate resin composition having high heat resistance. Particularly, since a light guide plate used in a portable display requires high thermal stability and long term reliability under high temperature and high humidity conditions, such a light guide plate is generally formed from an aromatic polycarbonate resin composition.

Recently, with diversification of the size of portable displays such as mobile phones and the like, there is a need for a light guide plate that has a large size and a smaller thickness than existing light guide plates having a size of about 2 to about 4 inches and a thickness of about 0.5 mm. Upon injection molding of such a large and thin light guide plate, it is necessary to secure sufficient flowability and transferability of the aromatic polycarbonate resin by injecting the aromatic polycarbonate resin at a higher temperature than a typical molding temperature. However, the light guide plate formed by injection molding at high temperature can exhibit a yellow color (yellowing phenomenon) in surface diffusion of light. Such a yellowing phenomenon of the light guide plate can become severe in use under high temperature and high humidity conditions over time.

Upon injection molding, additives such as polyol can be added to a polycarbonate resin in order to improve thermal stability, colors, and the like (see Korean Patent Publication No. 2011-0050381A and the like). However, this method can also cause side reactions due to the additives in use under high temperature and high humidity conditions for a long time.

Therefore, there is a need for a light guide plate that can reduce color deviation under high temperature and high humidity conditions while securing excellent properties in terms of discoloration resistance, brightness property (brightness uniformity), and the like.

SUMMARY

Exemplary embodiments can provide a light guide plate which employs a particular aromatic polycarbonate resin to suppress a yellowing phenomenon upon injection molding and can reduce color deviation under high temperature and high humidity conditions while securing excellent properties in terms of discoloration resistance, brightness property (brightness uniformity) and the like, a method for fabricating the same, and an aromatic polycarbonate resin for light guide plates, which can exhibit excellent properties in terms of injection molding properties, thermal stability, and reliability.

The light guide plate can be formed by injection molding of an aromatic polycarbonate resin that is a polymer of an aromatic dihydroxy compound and a diaryl carbonate, wherein the aromatic dihydroxy compound and the diaryl carbonate are present in a mole ratio of about 1:1.02 to about 1:1.35, and wherein the aromatic polycarbonate resin has a weight average molecular weight from about 10,000 g/mol to about 18,000 g/mol and includes about 5 mol % to about 30 mol % of terminal hydroxyl groups relative to total moles of terminal groups.

In one embodiment, the light guide plate may have a color deviation of about 0.005 to about 0.020, as measured after being left under conditions of about 80° C. and about 90% relative humidity (RH) for about 500 hours, and a percentage (brightness uniformity) of lowest brightness to highest brightness of about 80% to about 95%.

In one embodiment, the light guide plate includes a front surface, a rear surface facing the front surface, and side surfaces connecting the front surface to the rear surface, and the rear surface may be formed with an optical pattern.

In one embodiment, the side surfaces may include a first side surface on which a light source is placed; a second side surface facing the first side surface; a third side surface connecting the first side surface to the second side surface; and a fourth side surface facing the third side surface and connecting the first side surface to the second side surface.

In one embodiment, the aromatic polycarbonate resin may have a melt index (MI) of about 55 to about 165 g/10 minutes, as measured under conditions of about 300° C. and about 1.2 kgf in accordance with ASTM D1238.

In one embodiment, the aromatic polycarbonate resin may have a yellowness index variation ($\Delta YI$) of about 0.5 to about 3.5 as represented by the following Expression 1:

$$\text{Yellowness index variation } (\Delta YI)=YI_1-YI_0 \qquad \text{[Expression 1]}$$

wherein $YI_0$ is a yellowness index of the aromatic polycarbonate resin (light guide plate) subjected to injection molding at an injection temperature (cylinder temperature) of about 340° C. and a mold temperature of about 70° C. according to a typical cycle time, and $YI_1$ is a yellowness index of the aromatic polycarbonate resin (light guide plate) subjected to injection molding under the same conditions (injection temperature of about 340° C. and a mold temperature of about 70° C.) after being left in a molten state for about 5 minutes within a cylinder.

The method of fabricating the light guide plate according to exemplary embodiments can include: preparing an aromatic polycarbonate resin having a weight average molecular weight from about 10,000 g/mol to about 18,000 g/mol and including about 5 mol % to about 30 mol % of terminal hydroxyl groups relative to total moles of terminal groups by polymerizing an aromatic dihydroxy compound and a diaryl carbonate in a mole ratio of about 1:1.02 to about 1:1.35; and injection molding the aromatic polycarbonate resin.

In one embodiment, the injection molding may include: preparing a molten resin by heating the aromatic polycarbonate resin to an injection temperature (cylinder temperature) of about 320° C. to about 360° C., followed by injection molding the molten resin into a cavity of a mold having a mold temperature of about 50° C. to about 90° C. at an injection rate of about 300 mm/sec to about 800 mm/sec.

Other exemplary embodiments relate to an aromatic polycarbonate resin for light guide plates. The aromatic polycarbonate resin for light guide plates is a polymer of an aromatic dihydroxy compound and a diaryl carbonate, in which the aromatic dihydroxy compound and the diaryl carbonate are present in a mole ratio of about 1:1.02 to about 1:1.35, and has a weight average molecular weight of about 10,000 g/mol to about 18,000 g/mol and includes about 5 mol % to about 30 mol % of terminal hydroxyl groups relative to total moles of terminal groups.

In one embodiment, the aromatic polycarbonate resin may have a melt index (MI) of about 55 to about 165 g/10 minutes, as measured under conditions of about 300° C. and about 1.2 kgf in accordance with ASTM D1238.

DETAILED DESCRIPTION

Figure 1:
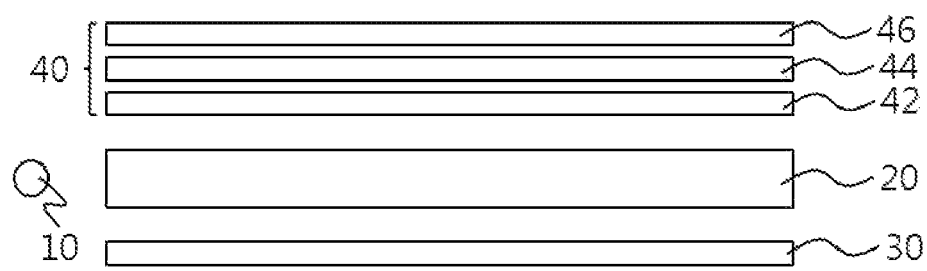
FIG. 1 is a sectional view of a typical backlight unit.

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A light guide plate according to the present invention may be obtained through injection molding of a particular aromatic polycarbonate resin for light guide plates.

The aromatic polycarbonate resin for light guide plates according to the present invention is a polymer of an aromatic dihydroxy compound and a diaryl carbonate, in which the aromatic dihydroxy compound and the diaryl carbonate may be present in a mole ratio (aromatic dihydroxy compound:diaryl carbonate) of about 1:1.02 to about 1:1.35, for example, about 1:1.02 to about 1:1.25. The aromatic polycarbonate resin may have a weight average molecular weight of about 10,000 g/mol to about 18,000 g/mol, for example, about 11,000 g/mol to about 17,000 g/mol as measured by gel permeation chromatography (GPC), and includes about 5 mol % to about 30 mol %, for example, about 10 mol % to about 28 mol %, of terminal hydroxyl groups, relative to the total moles (100 mol %) of all terminal groups, as measured by $^1$H-NMR.

In some embodiments, the aromatic polycarbonate resin may include terminal hydroxyl groups in an amount of about 5, 6, 7, 8, 9, 10, 11, 12, 13, 14, 15, 16, 17, 18, 19, 20, 21, 22, 23, 24, 25, 26, 27, 28, 29, or 30 mol %. Further, according to some embodiments of the present invention, the amount of terminal hydroxyl groups can be in a range from about any of the foregoing amounts to about any other of the foregoing amounts.

If the mole ratio of the aromatic dihydroxy compound to the diaryl carbonate is less than about 1:1.02, the content of the terminal hydroxyl group increases in the aromatic polycarbonate resin, which can thereby cause deterioration in mold release properties and thermal stability upon injection molding. If the mole ratio of the aromatic dihydroxy compound to the diaryl carbonate exceeds about 1:1.35, the raw material ratio becomes abnormal, which can thereby make it difficult to prepare an aromatic polycarbonate resin having a sufficient molecular weight.

If the weight average molecular weight of the aromatic polycarbonate resin is less than about 10,000 g/mol, there is a concern that desired properties of the light guide plate cannot be realized due to excessively low molecular weight. If the weight average molecular weight of the aromatic polycarbonate resin exceeds about 18,000 g/mol, there is a concern that formability of the aromatic polycarbonate resin can be reduced, thereby making it difficult to obtain a light guide plate having a desired shape, or the yellowing phenomenon can occur.

In addition, if the amount of the terminal hydroxyl groups in the aromatic polycarbonate resin is less than about 5 mol % relative to 100 mol % of total terminal groups, there is a concern that an aromatic polycarbonate resin having a sufficient molecular weight cannot be obtained, and if the amount of the terminal hydroxyl groups in the aromatic polycarbonate resin exceeds about 30 mol %, the aromatic polycarbonate resin can suffer from deterioration in release properties and thermal stability and thus cannot be applied to the light guide plate.

In one embodiment, the aromatic polycarbonate resin may be prepared through melt polymerization (esterification) of the aromatic dihydroxy compound and the diaryl carbonate.

The aromatic dihydroxy compound may be selected from any typical aromatic dihydroxy compound used for the preparation of the aromatic polycarbonate resin, and may be, for example, one or more compounds represented by Formula 1.

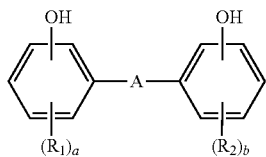

[Formula 1]

wherein A is a single bond, a substituted or unsubstituted $C_1$ to $C_{30}$ hydrocarbon group, —CO—, —S—, or —$SO_2$—; $R_1$ and $R_2$ are the same or different and are each independently a substituted or unsubstituted $C_1$ to $C_{30}$ alkyl group, or a substituted or unsubstituted $C_6$ to $C_{30}$ aryl group; and a and b are the same or different and are each independently an integer ranging from 0 to 4.

As used herein, the term "hydrocarbon group" refers to a linear, branched and/or cyclic saturated or unsaturated hydrocarbon group, unless otherwise specified. The term "substituted" means that a hydrogen atom is replaced by a substituent such as a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof.

In one embodiment, A may be a single bond, a substituted or unsubstituted $C_1$ to $C_{30}$ alkylene group, a substituted or unsubstituted $C_2$ to $C_5$ alkenylene group, a substituted or unsubstituted $C_2$ to $C_5$ alkylidene group, a substituted or unsubstituted $C_5$ to $C_6$ cycloalkylene group, a substituted or unsubstituted $C_5$ to $C_6$ cycloalkenylene group, a substituted or unsubstituted $C_5$ to $C_{10}$ cycloalkylidene group, a substituted or unsubstituted $C_6$ to $C_{30}$ arylene group, a substituted or unsubstituted $C_1$ to $C_{20}$ alkoxylene group, a halogen acid ester group, a carbonate ester group, —CO—, —S—, or —$SO_2$—; and $R_1$ and $R_2$ are each independently a substituted or unsubstituted $C_1$ to $C_{30}$ alkyl group, for example, a $C_1$ to $C_{10}$ alkyl group, or a substituted or unsubstituted $C_6$ to $C_{30}$ aryl group, for example, a $C_6$ to $C_{10}$ aryl group.

Examples of the aromatic dihydroxy compound may include without limitation 2,2-bis(4-hydroxyphenyl)propane, 4,4'-biphenol, 2,4-bis(4-hydroxyphenyl)-2-methylbutane, 1,1-bis(4-hydroxyphenyl)cyclohexane, 2,2-bis(3-chloro-4-hydroxyphenlyl) propane, 2,2-bis(3,5-dichloro-4-hydroxyphenyl)propane, and the like, and combinations thereof. In exemplary embodiments, 2,2-bis(4-hydroxyphenyl)propane may be used.

As the diaryl carbonate, typical diaryl carbonates used in preparation of polycarbonates may be employed. For example, a compound represented by Formula 2 may be utilized.

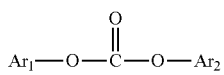

[Formula 2]

wherein $Ar_1$ and $Ar_2$ are the same or different and are each independently a substituted or unsubstituted $C_6$ to $C_{20}$ aryl group, for example, a substituted or unsubstituted $C_6$ to $C_{10}$ aryl group.

Examples of the diaryl carbonate may include without limitation diphenyl carbonate, ditolyl carbonate, bis(chlorophenyl)carbonate, m-cresyl carbonate, dinaphthyl carbonate, bis(diphenyl)carbonate, and the like, and combinations thereof. In exemplary embodiments, diphenyl carbonate can be used.

In one embodiment, the melt polymerization may be performed in the presence of a catalyst. As the catalyst, any catalyst typically used in melt polymerization of the aromatic polycarbonate resin may be used. For example, an alkali metal catalyst, an alkaline earth metal catalyst and the like, and combinations thereof may be employed. Examples of the alkali metal catalyst may include without limitation LiOH, NaOH, and/or KOH. These may be used alone or in combination thereof.

In one embodiment, the catalyst may be used in an amount of about 60 ppb to about 30 ppb (with reference to moles), for example, about 80 ppb to about 150 ppb, based on the amount of the aromatic dihydroxy compound, without being limited thereto. Within this range, it is possible to prevent a yellowing phenomenon due to the remaining catalyst.

The melt polymerization may be performed at about 250° C. to about 290° C., for example, at about 260° C. to about 280° C., under a pressure of about 0.1 torr to about 100 torr, for example, about 0.3 torr to about 50 torr, for about 1 hour to about 10 hours. Within this range, it is possible to prepare an aromatic polycarbonate resin having a desired weight average molecular weight and a desired amount of terminal hydroxyl groups according to the present invention.

In one embodiment, typical additives such as an antioxidant agent, a heat stabilizer, a release agent, and the like and combinations thereof may be further added upon polymerization. The additives may be used in an amount of about 0.01 to about 1 part by weight, for example, about 0.01 to about 0.1 parts by weight, relative to about 100 parts by weight of the reactant. In this case, it can be desirable that the amount of the additives be minimized in consideration of color deviation resistance.

With the method described above, the aromatic polycarbonate resin prepared by polymerization of the aromatic dihydroxy compound and the diaryl carbonate in the mole ratio as described above may include a hydroxyl group (—OH) of the aromatic dihydroxy compound and an aryloxy group of a phenoxy group of the diaryl carbonate as terminal groups.

In one embodiment, the aromatic polycarbonate resin may have a melt flow index from about 55 g/10 minutes to about 165 g/10 minutes, for example, from about 60 g/10 minutes to about 150 g/10 minutes, as measured at about 300° C. under a load of about 1.2 kgf in accordance with ASTM D1238. Within this range, the aromatic polycarbonate resin can be used to fabricate a light guide plate which can have excellent injection moldability and can exhibit low discoloration resistance and excellent brightness uniformity upon evaluation of long term reliability.

Further, the aromatic polycarbonate resin may have a yellowness index variation (ΔYI) from about 0.5 to about 3.5, for example, from about 1.0 to about 3.0, as represented by Expression 1. Within this range, the aromatic polycarbonate resin can be used to fabricate a light guide plate that can have excellent discoloration resistance.

Yellowness index variation (ΔYI)=$YI_1$−$YI_0$     [Expression 1]

wherein $YI_0$ is a yellowness index of the aromatic polycarbonate resin (light guide plate) subjected to injection molding at an injection temperature (cylinder temperature) of about 340° C. and a mold temperature of about 70° C. according to a typical cycle time, and $YI_1$ is a yellowness index of the aromatic polycarbonate resin (light guide plate) subjected to injection molding under the same conditions (injection temperature of about 340° C. and a mold temperature of about 70° C.) after being left in a molten state for about 5 minutes within a cylinder.

According to the present invention, the light guide plate may have a typical shape, for example, a wedge shape, a planar shape, and the like. In one embodiment, the light guide plate may have at least one convex-concave pattern (a pattern of prism shape, a cylindrical shape, and the like) on an inclined surface or a planar surface thereof. Such a convex-concave pattern may be formed by transferring a convex-concave section formed on a surface of a mold upon injection molding.

Figure 2:
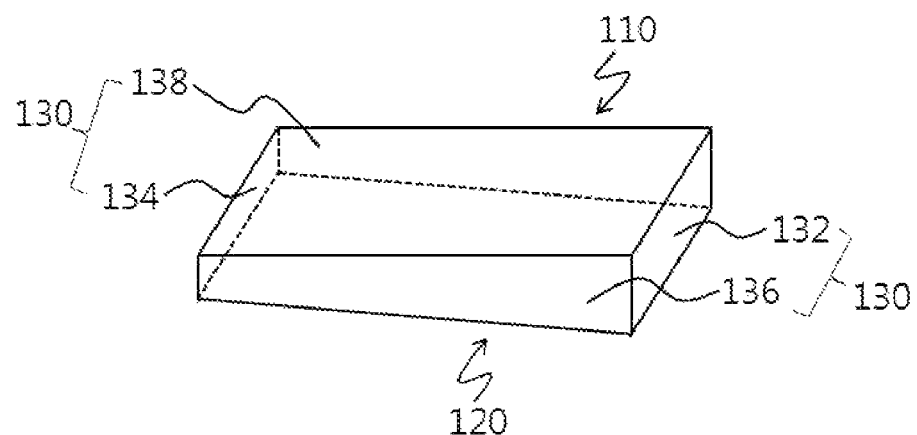
FIG. 2 is a schematic perspective view of a light guide plate according to one embodiment of the present invention.

FIG. 2 is a schematic perspective view of a light guide plate according to one embodiment of the present invention. Referring to FIG. 2, the light guide plate according to this embodiment includes a front surface 110, a rear surface 120 facing the front surface, and side surfaces 130 connecting the front surface 110 to the rear surface 120. Here, the rear surface 120 may be formed with an optical pattern (not shown).

The front surface 110 may be disposed to face a panel, for example, an LCD panel, of a display and allows light emitted from a lateral light source to travel towards the panel such that the display can be viewed.

The rear surface 120 is disposed to face the front surface 110 and can improve optical efficiency by reflecting some of the light emitted from the lateral light source towards the front surface 110. When the rear surface 120 is formed with the optical pattern, the optical pattern allows the light emitted from the light source to be directed towards the panel through the front surface 110 by total reflection on the optical pattern, thereby improving optical efficiency of the light guide plate.

The optical pattern may have any shape selected from among a concave shape, a convex shape and combinations thereof, and may be randomly formed without being limited to density, separation distance, and the like, so long as the pattern can reflect light from the lateral light source. Further, the optical pattern may have a conical shape, a prism bar shape, and the like, without being limited thereto. The optical pattern may have a height from about 6 μm to about 30 μm and a width or diameter from about 10 μm to about 35 μm, without being limited thereto.

The side surfaces 130 may include a first side surface 132 on which a light source is placed, a second side surface 134 facing the first side surface, a third side surface 136 connecting the first side surface 132 to the second side surface 134, and a fourth side surface 138 facing the third side surface 136 and connecting the first side surface 132 to the second side surface 134.

As shown in FIG. 2, the light guide plate may have an inclined surface (corresponding to a rear surface) such that the first side surface has a longer height than the second side surface, or may have a planar shape. For example, the light guide plate may have an inclined surface.

In addition, the light guide plate may have an average thickness from about 0.3 mm to about 0.7 mm, for example, from about 0.35 mm to about 0.50 mm Within this thickness range, the light guide plate may be applied to a portable thin film type display.

A method of fabricating a light guide plate according to the present invention includes preparing an aromatic polycarbonate resin through melt polymerization, and injection molding the aromatic polycarbonate resin to form the light guide plate.

In one embodiment, injection molding may be performed by heating the aromatic polycarbonate resin to an injection temperature (cylinder temperature) of about 320° C. to about 360° C., for example, about 330° C. to about 350° C., to prepare a molten resin, and injecting the molten resin into a cavity of a mold having a mold temperature of about 50° C. to about 90° C., for example, about 60° C. to about 80° C., at an injection rate of about 300 mm/sec to about 800 mm/sec, for example, about 500 mm/sec to about 700 mm/sec. Within these ranges of injection molding conditions, it is possible to fabricate a light guide plate exhibiting less color deviation and having excellent properties in terms of discoloration resistance, brightness quality (brightness uniformity), and the like.

Injection molding may be performed using, for example, a general steel mold, an insulation mold to which a low thermal conductivity material (ceramic, polyimide, or other resins) is partially applied, and the like. In addition, selective rapid heating or quenching of a mold surface may also be performed upon injection molding. For example, an insulation mold including zirconia ceramic may be used. The insulation mold can avoid formation of a solidified layer due to quenching of the molten resin in the mold cavity and can be suitable for fabrication of a light guide plate securing excellent transfer of a fine convex-concave pattern by facilitating filling of the mold cavity with the aromatic polycarbonate resin even in the case where the mold has a very low thickness, as compared with a general steel mold.

The light guide plate according to the present invention may have a color deviation of about 0.005 to about 0.020, for example, about 0.010 to about 0.020, as measured after being left under conditions of about 80° C. and about 90% RH for about 500 hours, and a percentage (brightness uniformity) of lowest brightness to highest brightness of about 80% to about 95%. When the light guide plate exhibits large color deviation and low brightness uniformity, the display provides different color sensation depending upon locations thereof, thereby causing consumer dissatisfaction.

Next, the present invention will be described in more detail with reference to the following examples. However, it should be understood that these examples are provided for illustration only and are not to be construed in any way as limiting the present invention.

EXAMPLES

Preparative Example 1

Preparation of Aromatic Polycarbonate Resin 2,2-bis(4-hydroxyphenyl)propane ("bisphenol A", BPA), diphenyl carbonate (DPC), and 150 ppb of KOH as a catalyst (with reference to moles of bisphenol A) are sequentially placed in the content ratio (mole ratio) as listed in Table 1, followed by removing oxygen with nitrogen. Then, the reactor is heated to 160° C., heated again to 190° C., and reaction is performed for 6 hours. After 6 hours, the reactor is heated again to 210° C. and maintained at 100 torr for 1 hour. Then, the reactor is heated again to 260° C. and maintained at 20 torr for 1 hour, followed by pressure reduction to 0.5 torr and maintaining for 1 hour, thereby preparing an aromatic polycarbonate resin (yield: 99.9%). The weight average molecular weight, content of the terminal hydroxyl group, melt index (MI) and spiral flow of the prepared aromatic polycarbonate resin are measured, and results are shown in Table 1.

Preparative Example 2

Preparation of Aromatic Polycarbonate Resin

An aromatic polycarbonate resin is prepared (yield: 99.9%) in the same manner as in Preparative Example 1 except that the amounts of 2,2-bis(4-hydroxyphenyl)propane and diphenyl carbonate are adjusted as listed in Table 1. The weight average molecular weight, content of the terminal hydroxyl group, melt index (MI) and spiral flow of the prepared aromatic polycarbonate resin are measured, and results are shown in Table 1.

Preparative Example 3

Preparation of Aromatic Polycarbonate Resin

An aromatic polycarbonate resin is prepared (yield: 99.9%) in the same manner as in Preparative Example 1 except that the amounts of 2,2-bis(4-hydroxyphenyl)propane and diphenyl carbonate are adjusted as listed in Table 1. The weight average molecular weight, content of the terminal hydroxyl group, melt index (MI) and spiral flow of the prepared aromatic polycarbonate resin are measured, and results are shown in Table 1.

Preparative Example 4

Preparation of Aromatic Polycarbonate Resin

An aromatic polycarbonate resin is prepared (yield: 99.9%) in the same manner as in Preparative Example 1 except that the amounts of 2,2-bis(4-hydroxyphenyl)propane and diphenyl carbonate are adjusted as listed in Table 1. The weight average molecular weight, content of the terminal hydroxyl group, melt index (MI) and spiral flow of the prepared aromatic polycarbonate resin are measured, and results are shown in Table 1.

Preparative Example 5

Preparation of Aromatic Polycarbonate Resin

An aromatic polycarbonate resin is prepared (yield: 99.9%) in the same manner as in Preparative Example 1 except that the amounts of 2,2-bis(4-hydroxyphenyl)propane and diphenyl carbonate are adjusted as listed in Table 1. The weight average molecular weight, content of the terminal hydroxyl group, melt index (MI) and spiral flow of the prepared aromatic polycarbonate resin are measured, and results are shown in Table 1.

Preparative Example 6

Preparation of Aromatic Polycarbonate Resin

An aromatic polycarbonate resin is prepared (yield: 99.9%) in the same manner as in Preparative Example 1 except that the amounts of 2,2-bis(4-hydroxyphenyl)propane and diphenyl carbonate are adjusted as listed in Table 1. The weight average molecular weight, content of the terminal hydroxyl group, melt index (MI) and spiral flow of the prepared aromatic polycarbonate resin are measured, and results are shown in Table 1.

Preparative Example 7

Preparation of Aromatic Polycarbonate Resin

An aromatic polycarbonate resin is prepared (yield: 99.9%) in the same manner as in Preparative Example 1 except that the amounts of 2,2-bis(4-hydroxyphenyl)propane and diphenyl carbonate are adjusted as listed in Table 1. The weight average molecular weight, content of the terminal hydroxyl group, melt index (MI) and spiral flow of the prepared aromatic polycarbonate resin are measured, and results are shown in Table 1.

Preparative Example 8

Preparation of Aromatic Polycarbonate Resin

An aromatic polycarbonate resin is prepared (yield: 99.9%) in the same manner as in Preparative Example 1 except that the amounts of 2,2-bis(4-hydroxyphenyl)propane and diphenyl carbonate are adjusted as listed in Table 1. The weight average molecular weight, content of the terminal hydroxyl group, melt index (MI) and spiral flow of the prepared aromatic polycarbonate resin are measured, and results are shown in Table 1.

Evaluation of Properties (1) Weight average molecular weight (unit: g/mol) is measured by gel permeation chromatography (GPC).

(2) Melt index (MI, unit: g/10 minutes) is measured at 300° C. under a load of 1.2 kgf in accordance with ASTM D1238.

(3) An amount of terminal hydroxyl group (OH) (unit: mole %) is calculated based on an area ratio of hydroxyl group proton and phenyl group proton in the terminal structure in accordance with $^1$H-NMR spectrum.

(4) Spiral flow (unit: cm): A specimen is prepared by injection molding into a 2 mm thick spiral-shaped mold using a 6 oz injection molding machine under conditions of an injection temperature of 320° C. and a mold temperature of 60° C., followed by measuring the length of the molded specimen. Longer spiral flow indicates better moldability.

(5) Releasability (unit: N): After forming a specimen by injection molding into a 200 ml paper cup-shaped mold using a 6 oz injection molding machine under conditions of an injection temperature of 320° C. and a mold temperature of 60° C., a force applied to an eject-pin at a time of separating the specimen from the mold core is measured. A lower force indicates better releasability.

TABLE 1

|  | Preparative Example | | | | | | | |
| --- | --- | --- | --- | --- | --- | --- | --- | --- |
|  | 1 | 2 | 3 | 4 | 5 | 6 | 7 | 8 |
| Mole ratio (DPC/BPA) | 1.02 | 1.15 | 1.10 | 1.15 | 1.22 | 1.01 | 1.10 | 1.27 |
| Weight average molecular weight (g/mol) | 16,800 | 16,900 | 15,200 | 13,100 | 11,900 | 16,800 | 18,200 | 19,400 |
| Terminal OH amount (%) | 27 | 15 | 20 | 15 | 11 | 33 | 20 | 8 |
| Melt index (g/10 min) | 62 | 62 | 80 | 110 | 145 | 62 | 50 | 42 |
| Spiral flow (cm) | 25 | 25 | 30 | 37 | 45 | 25 | 19 | 15 |
| Releasability (N) | 230 | 220 | 210 | 202 | 185 | 280 | 250 | 220 |

Example 1

A light guide plate is fabricated by injection molding the aromatic polycarbonate resin prepared in Preparative Example 1 using a 130 ton injection molding machine (Toyo Machinery and Metal Co., Ltd.), which includes a thin mold having a diagonal length of 5 inches on a front surface thereof and an average thickness of 0.4 mm, under conditions of an injection temperature 340° C., a mold temperature 70° C., an injection rate of 500 mm/sec, and a cycle time of 13 seconds. A backlight unit including the light guide plate is fabricated, followed by evaluation of properties. Results are shown in Table 2.

Examples 2 to 5

Light guide plates are fabricated in the same manner as in Example 1 except that the aromatic polycarbonate resins prepared in Preparative Examples 2 to 5 are used instead of the aromatic polycarbonate resin of Example 1. Backlight units including the light guide plates are fabricated, followed by evaluation of properties. Results are shown in Table 2.

Comparative Examples 1 to 3

Light guide plates are fabricated in the same manner as in Example 1 except that the aromatic polycarbonate resins prepared in Preparative Examples 6 to 8 are used instead of the aromatic polycarbonate resin of Example 1. Backlight units including the light guide plates are fabricated, followed by evaluation of properties. Results are shown in Table 2.

Evaluation of Properties (1) Yellowness index variation ($\Delta YI$) upon injection molding: In fabrication of the light guide plate, the aromatic polycarbonate resin is maintained in a molten state for 5 minutes in a cylinder at an injection temperature (cylinder temperature) of 340° C. and a mold temperature of 70° C., followed by injection molding to prepare a specimen of the light guide plate. Then, yellowness index variation upon injection molding is calculated by Expression 1.

Yellowness index variation ($\Delta YI$)=$YI_1 - YI_0$   [Expression 1]

wherein $YI_0$ is a yellowness index of the aromatic polycarbonate resin (light guide plate) subjected to injection molding at an injection temperature (cylinder temperature) of about 340° C. and a mold temperature of about 70° C. according to a typical cycle time, and $YI_1$ is a yellowness index of the aromatic polycarbonate resin (light guide plate) subjected to injection molding under the same conditions (injection temperature of about 340° C. and a mold temperature of about 70° C.) after being left in a molten state for about 5 minutes within a cylinder.

(2) Measurement of color deviation ($\Delta y$) and brightness (unit: cd): After each of the backlight units (BLUs) prepared in Examples and Comparative Examples is left at room temperature for 1 day, color coordinates (x, y) and brightness at nine arbitrary points on the light guide plate of the backlight unit are measured on the CIE chromaticity diagram at a voltage of 15 V using a color brightness meter Model BM-7 (Topcon Corporation). Then, a difference ($\Delta y$) between a maximum value and a minimum value of the y coordinate value among the color coordinates is calculated.

(3) Evaluation of long term reliability: After each of the BLUs prepared in Examples and Comparative Examples is left at a temperature of 80° C. and a relative humidity of 90% for 500 hours in a constant temperature/humidity chamber, color deviation and brightness are measured and calculated, as mentioned above. Then, a percentage of the minimum brightness to the maximum brightness (brightness uniformity (unit: %)) is calculated.

TABLE 2

|  |  | Example | | | | | Comparative Example | | |
| --- | --- | --- | --- | --- | --- | --- | --- | --- | --- |
|  |  | 1 | 2 | 3 | 4 | 5 | 1 | 2 | 3 |
|  |  | Preparative Example | | | | | | | |
| Aromatic polycarbonate resin | | 1 | 2 | 3 | 4 | 5 | 6 | 7 | 8 |
| Yellowness index variation ($\Delta YI$) upon injection molding | | 3.0 | 1.4 | 2.2 | 1.5 | 1.0 | 4.0 | 2.0 | 0.8 |
| Injection molding of light guide plate | Color deviation ($\Delta y$) | 0.020 | 0.015 | 0.017 | 0.012 | 0.010 | 0.025 | 0.028 | 0.030 |
|  | Brightness (cd) | 5,500 | 5,850 | 6,080 | 6,270 | 6,550 | 5,490 | 5,070 | 4,580 |
| Evaluation of long term reliability | Color deviation ($\Delta y$) | 0.018 | 0.014 | 0.016 | 0.012 | 0.010 | 0.028 | 0.030 | 0.035 |
|  | Brightness (cd) | 5,350 | 5,800 | 6,010 | 6,130 | 6,380 | 4.880 | 4,250 | 3.530 |
|  | Brightness uniformity (%) | 83.5 | 85.5 | 87.2 | 90.7 | 91.5 | 81.1 | 78.5 | 77.7 |

From the results, it can be seen that the light guide plates (Examples 1 to 5) prepared using the aromatic polycarbonate resins having weight average molecular weights and the amounts of the terminal hydroxyl group falling within the range of the present invention secured good releasability and moldability upon injection molding, have a low yellowness index variation of 3 or less, and exhibit low color deviation and high brightness. Accordingly, it can be seen that these light guide plates exhibit the same or reduced color deviation in evaluation of long term reliability under high temperature/high humidity conditions, and maintain high brightness and excellent brightness uniformity.

In contrast, the light guide plates of Comparative Examples 1 to 3 have significant color deviation and relatively low brightness. Particularly, the light guide plate of Comparative Example 1 exhibits large yellowness index variation and thus has a high possibility of failure depending upon injection molding conditions. Further, it can be seen that the light guide plates of Comparative Examples 1 to 3 exhibit significant reduction in brightness and brightness uniformity after evaluation of long term reliability.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A light guide plate formed by injection molding of an aromatic polycarbonate resin that is a polymer of an aromatic dihydroxy compound and a diaryl carbonate,
wherein the aromatic dihydroxy compound and the diaryl carbonate are present in a mole ratio of about 1:1.02 to about 1:1.35,
wherein the aromatic polycarbonate resin has a weight average molecular weight from about 10,000 g/mol to about 18,000 g/mol and includes about 5 mol % to about 30 mol % of terminal hydroxyl groups relative to total moles of terminal groups, and
wherein the aromatic polycarbonate resin has a melt index (MI) of about 55 to about 165 g/10 minutes, as measured under conditions of about 300° C. and about 1.2 kgf in accordance with ASTM D1238.

2. The light guide plate according to claim 1, wherein the light guide plate has a color deviation of about 0.005 to about 0.020, as measured after being left under conditions of about 80° C. and about 90% RH for about 500 hours, and a percentage (brightness uniformity) of lowest brightness to highest brightness of about 80% to about 95%.

3. The light guide plate according to claim 1, wherein the light guide plate comprises a front surface, a rear surface facing the front surface and formed with an optical pattern, and side surfaces connecting the front surface to the rear surface.

4. The light guide plate according to claim 1, wherein the side surface comprise a first side surface on which a light source is placed; a second side surface facing the first side surface; a third side surface connecting the first side surface to the second side surface; and a fourth side surface facing the third side surface and connecting the first side surface to the second side surface.

5. The light guide plate according to claim 1, wherein the aromatic polycarbonate resin has a yellowness index variation ($\Delta YI$) of about 0.5 to about 3.5 as represented by the following Expression 1:

$$\text{Yellowness index variation } (\Delta YI) = YI_1 - YI_0 \qquad \text{[Expression 1]}$$

wherein $YI_0$ is a yellowness index of the aromatic polycarbonate resin (light guide plate) subjected to injection molding at an injection temperature (cylinder temperature) of about 340° C. and a mold temperature of about 70° C. according to a typical cycle time, and $YI_1$ is a yellowness index of the aromatic polycarbonate resin (light guide plate) subjected to injection molding under the same conditions (injection temperature of about 340° C. and a mold temperature of about 70° C.) after being left in a molten state for about 5 minutes within a cylinder.

6. A method of fabricating a light guide plate, comprising:
preparing an aromatic polycarbonate resin having a weight average molecular weight from about 10,000 g/mol to about 18,000 g/mol and a melt index (MI) of about 55 to about 165 g/10 minutes, as measured under conditions of about 300° C. and about 1.2 kgf in accordance with ASTM D1238 and including about 5 mol % to about 30 mol % terminal hydroxyl groups relative to total moles of terminal groups by polymerizing an aromatic dihydroxy compound and a diaryl carbonate in a mole ratio of about 1:1.02 to about 1:1.35; and
injection molding the aromatic polycarbonate resin.

7. The method according to claim 6, wherein the injection molding comprises preparing a molten resin by heating the aromatic polycarbonate resin to an injection temperature (cylinder temperature) of about 320° C. to about 360° C., followed by injection molding the molten resin into a cavity of a mold having a mold temperature of about 50° C. to about 90° C. at an injection rate of about 300 mm/sec to about 800 mm/sec.

8. An aromatic polycarbonate resin for light guide plates, the aromatic polycarbonate resin being a polymer of an aromatic dihydroxy compound and a diaryl carbonate,
wherein the aromatic dihydroxy compound and the diaryl carbonate are present in a mole ratio of about 1:1.02 to about 1:1.35,
wherein the aromatic polycarbonate resin has a weight average molecular weight of about 10,000 g/mol to about 18,000 g/mol and includes about 5 mol % to about 30 mol % of terminal hydroxyl groups relative to total moles of terminal groups, and
wherein the aromatic polycarbonate resin has a melt index (MI) of about 55 to about 165 g/10 minutes, as measured under conditions of about 300° C. and about 1.2 kgf in accordance with ASTM D1238.

* * * * *